United States Patent [19]

Szabó

[11] 4,200,307
[45] Apr. 29, 1980

[54] MOUNT FOR SUPPORTING A SUSPENSION STRUT ASSEMBLY ON A VEHICLE BODY

[75] Inventor: László Szabó, Lehre, Fed. Rep. of Germany

[73] Assignee: Volkswagenwerk Aktiengesellschaft, Wolfsburg, Fed. Rep. of Germany

[21] Appl. No.: 946,444

[22] Filed: Sep. 26, 1978

[30] Foreign Application Priority Data

Oct. 8, 1977 [DE] Fed. Rep. of Germany ....... 2745380

[51] Int. Cl.² .............................................. B60G 11/52
[52] U.S. Cl. ................................. 280/668; 267/20 A; 280/696
[58] Field of Search ............... 280/660, 666, 667, 668, 280/670, 673, 690, 692, 696; 267/20 A

[56] References Cited

U.S. PATENT DOCUMENTS 4,042,259  8/1977  Fiedler .................................. 280/668
4,111,456  9/1978  Arnold .................................. 280/692

Primary Examiner—Robert R. Song
Assistant Examiner—John A. Carroll
Attorney, Agent, or Firm—Spencer & Kaye

[57] ABSTRACT

A mount for attaching a suspension assembly to the rim zone of an aperture in the vehicle body has an outer flange which forms part of an antivibration unit to which the upper end of a shock absorber piston rod and a spring seat disc—forming part of the suspension assembly—are secured. The outer flange is tightened from below to the rim zone of the aperture by securing screws. The outer flange has an elongated, at least approximately oval-shaped outline and further, the outline of the aperture is of substantially lesser dimension than the length dimension of the elongated outer flange. The aperture has, at least in one direction, a diametral dimension that is slightly greater than the width dimension of the elongated outer flange. The diameter of the spring seat disc is sufficiently small to permit upward removal of the antivibration unit and the spring seat disc after removal of the securing screws and upon tilting the antivibration unit about a transverse axis thereof.

7 Claims, 4 Drawing Figures

MOUNT FOR SUPPORTING A SUSPENSION STRUT ASSEMBLY ON A VEHICLE BODY

BACKGROUND OF THE INVENTION

This invention relates to a mount for supporting a suspension strut assembly on a vehicle body. The strut assembly includes a coil spring engaged at its upper end by an upper spring seat disc and a shock absorber having an upwardly extending piston rod. The upper spring seat disc, together with the upper end of the shock absorber piston rod, is supported on the vehicle body by means of a common, removable rubber-and-metal antivibration unit. The vehicle body is provided with an opening in the zone where the strut assembly is attached. The zone is hereafter referred to as "location of support". The piston rod which is secured to the antivibration unit by a nut, is accessible through the opening. An outer metal flange of the antivibration unit is tensioned from below by means of securing screws against the rim zones of the opening.

An arrangement of the above-outlined type is known and is disclosed, for example, in German Accepted Published Patent Application (Auslegeschrift) No. 2,435,723 and German Laid-Open Application (Offenlegungsschrift) No. 2,447,821.

Mounts of this type provide for a simple removal of a faulty shock absorber. Thus, it suffices to loosen a few securing screws and to pull the faulty shock absorber simply upwardly through the opening in the vehicle body without the need of removing or entirely disassembling the other wheel-guiding components (particularly the wheel-guiding portion) of the suspension strut assembly.

According to the known mount shown in FIG. 3 of the above-noted German Accepted Published Patent Application No. 2,435,723, the opening of the vehicle body at the location of support has an approximately circular contour with two diametrically oppositely located, radially outwardly oriented tab-shaped enlargements. The outer metal flange of the antivibration unit which is to be tightened from below against the rim of the opening also has an approximately circular external contour with two diametrically opposite, radially outwardly extending, tab-shaped projections for the securing screw. The diameter of the circular contour of the metal flange is slightly smaller than the diameter of the circular contour of the opening. Similarly, the contour of the tab-shaped projections is somewhat smaller than the contour of the tab-shaped enlargements of the opening. In the assembled condition the tab-shaped projections of the metal flange form an angle of approximately 90° with the tab-shaped enlargements of the opening. For removing the shock absorber or parts thereof, the antivibration unit can be removed outwardly together with the shock absorber piston rod after loosening the securing screw and a subsequent rotation of the antivibration mount about the above-noted angle of approximately 90°. Since the relatively large vertical forces which affect the suspension strut assembly are transmitted to the vehicle body exclusively through the tab-shaped projections, the latter have to be of sufficiently large dimension to maintain a proper overlap between the metal flange of the antivibration unit and the vehicle body. Tab-shaped projections of large dimension, however, require correspondingly large tab-shaped extensions in the opening; this, in turn, reduces the strength of the vehicle body in the location of support. Thus, in such a construction it is thus necessary to find a compromise between the dimensions of the tab-shaped projections and the dimensions of the tab-shaped extensions of the opening.

According to another known arrangement, as shown in FIG. 4 of German Laid-Open Application No. 2,447,821, at the location of support there is provided, in the vehicle body, a circular opening of relatively large diameter against the rim of which the outer metal flange of the antivibration unit is tightened with the interposition of an intermediate flange. The overlaps between the intermediate flange, on the one hand, and the rim of the opening and, respectively, the metal flange, on the other hand, are correspondingly large. Since the intermediate flange is tightened from above against the rim of the opening, the vertical forces introduced by the suspension strut assembly have to be transmitted through the securing screws between the intermediate flange and the vehicle body.

SUMMARY OF THE INVENTION

It is an object of the invention to provide an improved mount of the above-outlined type which ensures that the outer metal flange of the antivibration unit can be tightened from below against the rim of the opening in the vehicle body and further, without weakening the location of support in the vehicle body, there is ensured a relatively large overlap between the metal flange and the vehicle body.

This object and others to become apparent as the specification progresses, are accomplished by the invention, according to which, briefly stated, the mount for attaching a suspension assembly to the rim zone of an aperture in the vehicle body has an outer flange which forms part of an antivibration unit to which the upper end of a shock absorber piston rod and a spring seat disc—forming part of the suspension assembly—are secured. The outer flange is tightened from below to the rim zone of the aperture by securing screws. The outer flange has an elongated, at least approximately oval-shaped outline and further, the outline of the aperture is of substantially lesser dimension than the length dimension of the elongated outer flange. The aperture has, at least in one direction, a diametral dimension that is slightly greater than the width dimension of the elongated outer flange. The diameter of the spring seat disc is sufficiently small to permit upward removal of the antivibration unit and the spring seat disc after removal of the securing screws and upon tilting the antivibration unit about a transverse axis thereof.

The outer metal flange thus has an elongated configuration and may, by tilting it about its transverse axis, be pulled outwardly through the opening and further, the width of the metal flange is only slightly smaller than the associated zone of the rim countour of the opening, so that the metal flange is capable of engaging a large area at the vehicle body.

DESCRIPTION OF THE PREFERRED EMBODIMENT

Figure 1:
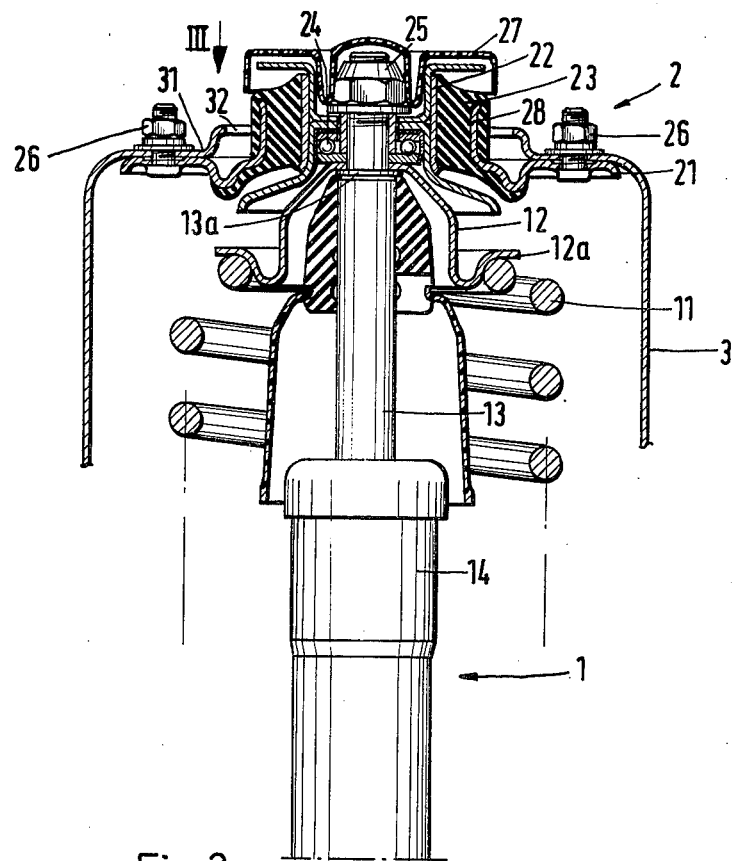
FIG. 1 is a longitudinal sectional view of a preferred embodiment of the invention taken along a sectional plane that is parallel to the length dimension of the vehicle on which the structure is mounted.

Turning now to FIG. 1, there is shown the upper portion of a suspension strut assembly, generally indicated at 1, which, in essence, is formed of a shock absorber tube 14, a shock absorber piston rod 13 and a coil spring 11 surrounding the shock absorber. The suspension strut assembly is elastically and movably articulated to a vehicle body component 3 by means of an antivibration unit generally indicated at 2. The antivibration unit 2 has a generally cylindrical inner sleeve 22 and a generally cylindrical outer sleeve 28, the lower end of which continues in an outer metal flange 21 which is connected to the vehicle body 3 by means of securing screws 26. A rubber element 23 is vulcanized between the inner sleeve 22 and the outer sleeve 28. The rubber element 23 is, in the embodiment illustrated, exposed substantially exclusively to shearing forces. The free end of the piston rod 13 of the shock absorber is connected with the inner sleeve 22 of the antivibration unit 2 by means of an axial roller bearing 24 and is tightened to the antivibration unit 2 by a nut 25. A dust guard 27 which also protects the rubber element 23 is inserted over the nut 25. Between the ball bearing 24 and a radial shoulder 13a of the piston rod 13 there is clamped (by means of the nut 25) a cup-shaped member 12, the lower edge of which is bent upwardly and then radially outwardly to constitute an annular spring seat disc 12a. The spring seat disc 12a engages the upper end of the coil spring 11. The lower portion of the coil spring 11 as well as the lower spring seat disc arranged on the shock absorber 14 or a tubular support member are not illustrated since these components are of no significance with regard to the invention. The spring seat disc 12a and the coil spring in engagement therewith are thus supported, together with the upper end of the piston rod 13, on the vehicle body with the intermediary of the rubber-and-metal antivibration unit 2. The vehicle body 3, at the location of support 31 for the suspension strut assembly, is provided with an aperture 32 into which projects, from below, the antivibration unit 2, together with the upper end of the piston rod 13 which is surrounded by the unit 2. The outer metal flange 21 of the antivibration unit 2 lies, from below, against the rim zone of the aperture 32 and is tightened thereagainst by means of screws 26.

Figure 2:
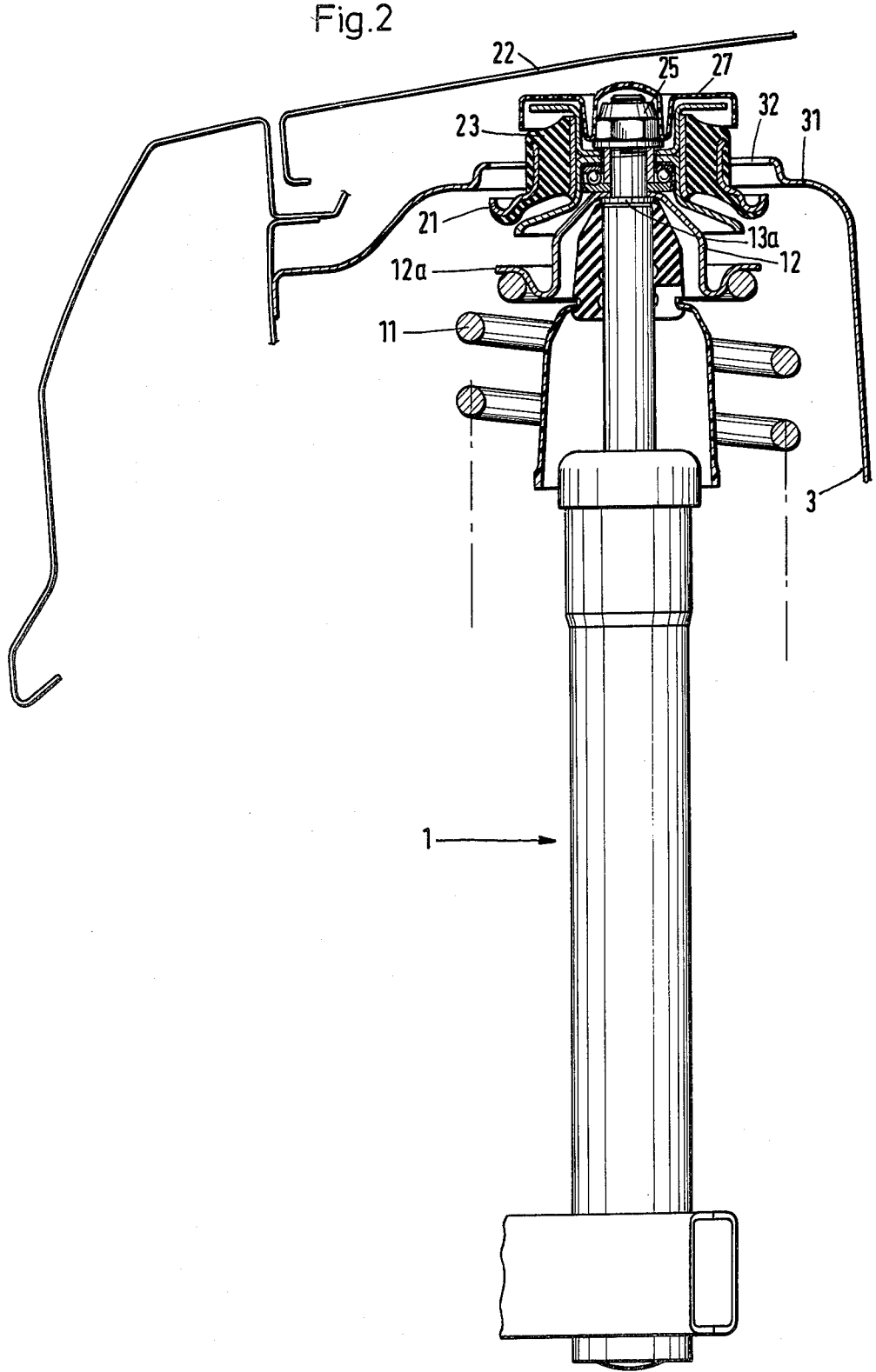
FIG. 2 is a longitudinal sectional view of the same embodiment taken along a sectional plane that is transverse to the length dimension of the vehicle on which the structure is mounted.

The aperture 32 has an at least approximately quadratic outline and is void of any additional enlargements which would weaken the strength of the support zone. The corners of the aperture are rounded. Instead of a quadratic configuration, the aperture 32 may have a generally circular shape as shown in FIG. 4. The outer metal flange 21 of the antivibration unit 2 has an elongated, at least approximately oval outline. This configuration may be well observed in FIG. 3 in which the outer metal flange is a hidden component and is thus shown only in broken lines. As it can further be observed in FIG. 3 in conjunction with FIGS. 1 and 2, the outline of the aperture 32 is substantially smaller than the length a of the elongated metal flange 21. At least in one direction (such as the direction that is transverse to the length dimension of the vehicle) the aperture 32 is slightly wider than the width b of the metal flange 21.

This arrangement provides that the antivibration unit can be pulled out upwardly through the aperture 32 in a simple manner if, for example, a faulty shock absorber has to be replaced. For this operation first the coil spring 11 has to be blocked, the nut 25 removed and the terminus of the piston rod 13 pushed out downwardly from the antivibration unit 2. After loosening the securing screws 26, the antivibration unit 2 may be pulled out upwardly through the aperture 32 without difficulty upon tilting it about the short axis of the metal flange 21.

The outline of the aperture 32 and the diameter of the upper spring seat disc 12a have to have dimensions so coordinated with respect to one another that the upper spring seat disc too, is capable of passing through the aperture 32 because only then it is possible to pull out upwardly through the aperture the shock absorber piston rod or other components of the shock absorber, unless the upper spring seat disc 12a is of a multipart design as disclosed in German Accepted Published Patent Application No. 2,435,723.

Figure 3:
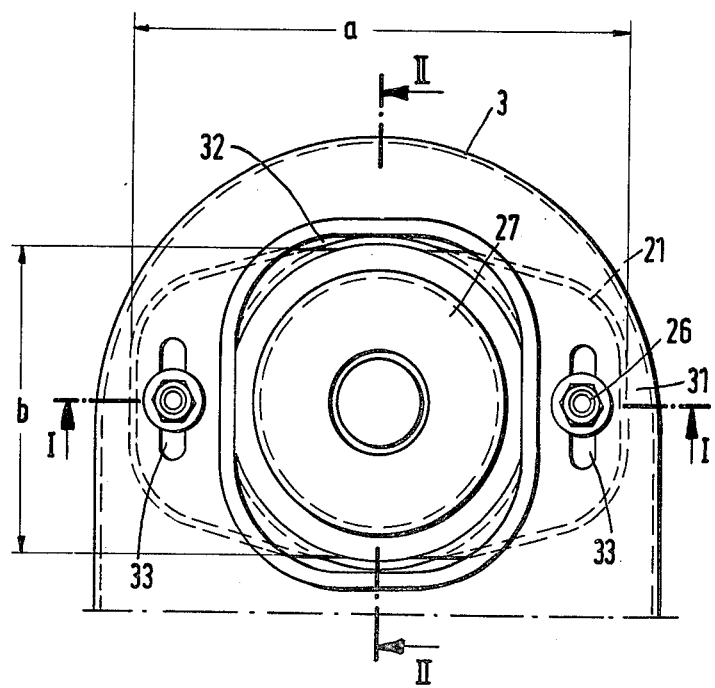
FIG. 3 is a top plan view of the same embodiment as seen in the direction of the arrow III of FIG. 1.
Figure 4:
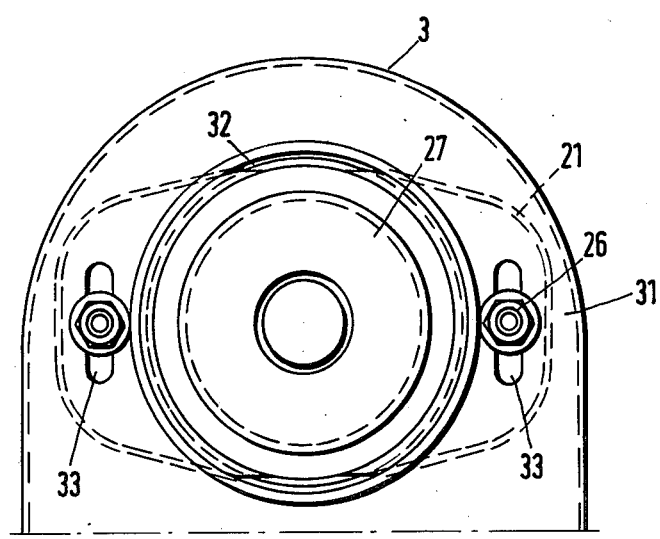
FIG. 4 is a top plan view of a similar embodiment as seen in FIG. 3.

As it is particularly well seen in FIG. 3, the vertical forces introduced by the suspension strut assembly are distributed over a relatively large surface area of the location of support 31, because an overlap of substantial area is provided between the metal flange 21 and the vehicle body 3. In order to maintain the dimensions of the aperture 32 at a smallest possible value and to obtain an overlap between the metal flange 21 and the vehicle body of an as large a magnitude as possible, in the embodiment shown the last upper turn of the coil spring 11 is of reduced diameter with respect to the diameter of the coil spring 11 as a whole. By means of this measure, the diameter of the upper spring seat disc 12a too, can be maintained at a small value.

According to an advantageous feature of the invention, the longitudinal axis (that is, the length dimension) of the elongated outer metal flange 21 of the antivibration unit 2 is oriented at least approximately parallel to the length dimension of the vehicle. In this manner, without weakening the strength of the location of support 31, there is provided a simple possibility to adjust the wheel camber. For this purpose—as shown in FIG. 3—at the location of support 31 of the vehicle body, there are provided two slots 33 which extend approximately transversely to the length dimension of the vehicle and through which the securing screws of the outer metal flange 21 project. It is seen that by shifting the securing screws 26 within the slots 33, the wheel camber is varied.

It is to be understood that the above description of the present invention is susceptible to various modifications, changes and adaptations, and the same are intended to be comprehended within the meaning and range of equivalents of the appended claims.

What is claimed is:

1. In a mount for attaching a suspension means to a vehicle body at a location of support; the suspension means having a shock absorber including an upwardly extending pistor rod having an upper end, a coil spring having an upper end and a spring seat disc engaging the upper end of the coil spring; an antivibration unit; means connecting the upper end of the piston rod and the spring seat disc to the antivibration unit; the mount connecting the antivibration unit to the vehicle body and having an outer flange forming part of the antivibration unit; an aperture provided in the vehicle body; securing screws tightening the outer flange from below to a rim zone of the aperture; the improvement wherein said outer flange has an elongated, at least approximately oval-shaped outline and wherein the outline of said aperture is of substantially lesser dimension than the length dimension of the elongated outer flange, and further wherein said aperture has, at least in one direction, a diametral dimension that is slightly greater than the width dimension of said elongated outer flange and further wherein the diameter of said spring seat disc is sufficiently small to permit upward removal of said antivibration unit and said spring seat disc after loosening said securing screws and upon tilting said antivibration unit about a transverse axis thereof.

2. A mount as defined in claim 1, wherein said diametral dimension of said aperture extends transversely to the length dimension of the vehicle.

3. A mount as defined in claim 1, wherein said upper end of said coil spring is constituted by a terminal turn; said terminal turn and said spring seat disc engaging said terminal turn having a diameter which is less than that of the coil spring.

4. A mount as defined in claim 1, wherein said aperture is circular.

5. A mount as defined in claim 1, wherein said aperture has a quadratic shape with rounded corners.

6. A mount as defined in claim 1, wherein said elongated outer flange has an at least approximately rectangular outline.

7. A mount as defined in claim 1, further comprising means defining slot openings in said vehicle body in said rim zone for receiving respective securing screws; said slot openings extending at least approximately transversely to the length dimension of the vehicle.

* * * * *